Inventor:
Joel B. Guin

June 17, 1969 J. B. GUIN 3,450,381
LEVER OPERATED FLOW CONTROL DEVICE WITH DASHPOT
Filed Feb. 13, 1967 Sheet 2 of 8
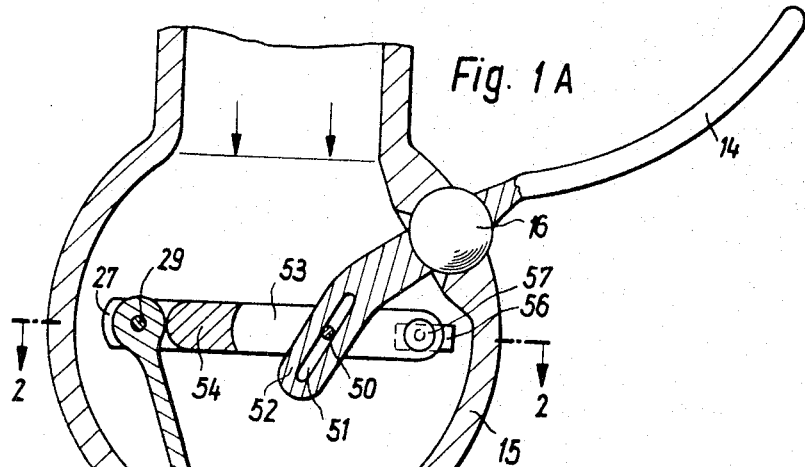
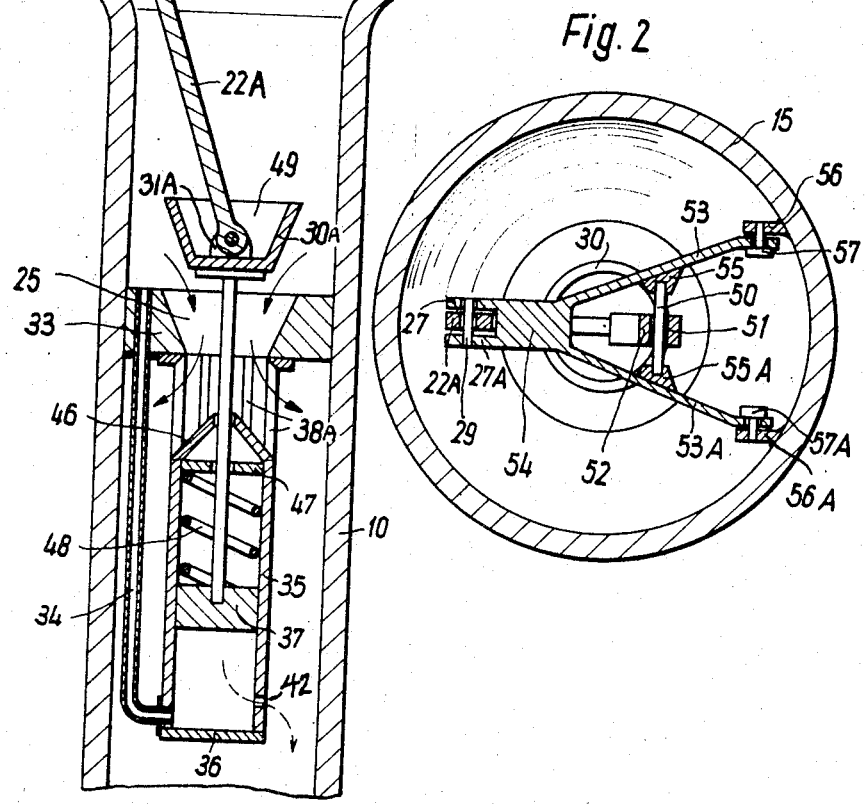
Inventor:
Joel B. Guin June 17, 1969 J. B. GUIN 3,450,381
LEVER OPERATED FLOW CONTROL DEVICE WITH DASHPOT
Filed Feb. 13, 1967 Sheet 3 of 8

Inventor:
Joel B. Guin

Inventor:
Joel B. Guin

Inventor:
Joel B. Guin

United States Patent Office 3,450,381
Patented June 17, 1969

3,450,381
LEVER OPERATED FLOW CONTROL DEVICE WITH DASHPOT
Joel B. Guin, 148 E. 48th St., New York, N.Y. 10017
Filed Feb. 13, 1967, Ser. No. 617,013
Int. Cl. F16k 21/10, 31/48; E03d 3/04
U.S. Cl. 251—50       3 Claims

ABSTRACT OF THE DISCLOSURE

This flow control device enables the user to control the quantity, speed and duration of flow of fluids through fluid-carrying means by a novel arrangement of levers and a lift-rod on the upstream side and a lift-rod connecting the valve to a time control means such as a dashpot on the downstream side of the valve. In the preferred embodiment a main activating lever penetrates a ball which is rotatably mounted in an enlarged portion or bulge in a pipe, the outer end of the lever serving as a hand-lever and the inner end being linked by one or more articulating rods or levers to the valve in such manner as to cause the valve to rise when the hand-lever end is depressed. The valve is tapered to fit snugly into the valve-seat. A rod mounted on the lower or downstream side of the valve connects with a piston movably disposed in a dashpot which is closed at its lower end except for an outlet hole for fluid from the dashpot and an inlet hole for a by-pass tube connecting with a channel through the valve seat for fluid to flow from the upstream side of the valve into the space in the dashpot below the piston. The size of the outlet hole and the volume of the space below the piston affect the duration of flow through the valve. The extent to which the hand-lever is depressed affects the size of the valve opening and the height to which the piston is raised in the dashpot.

Figure 1:
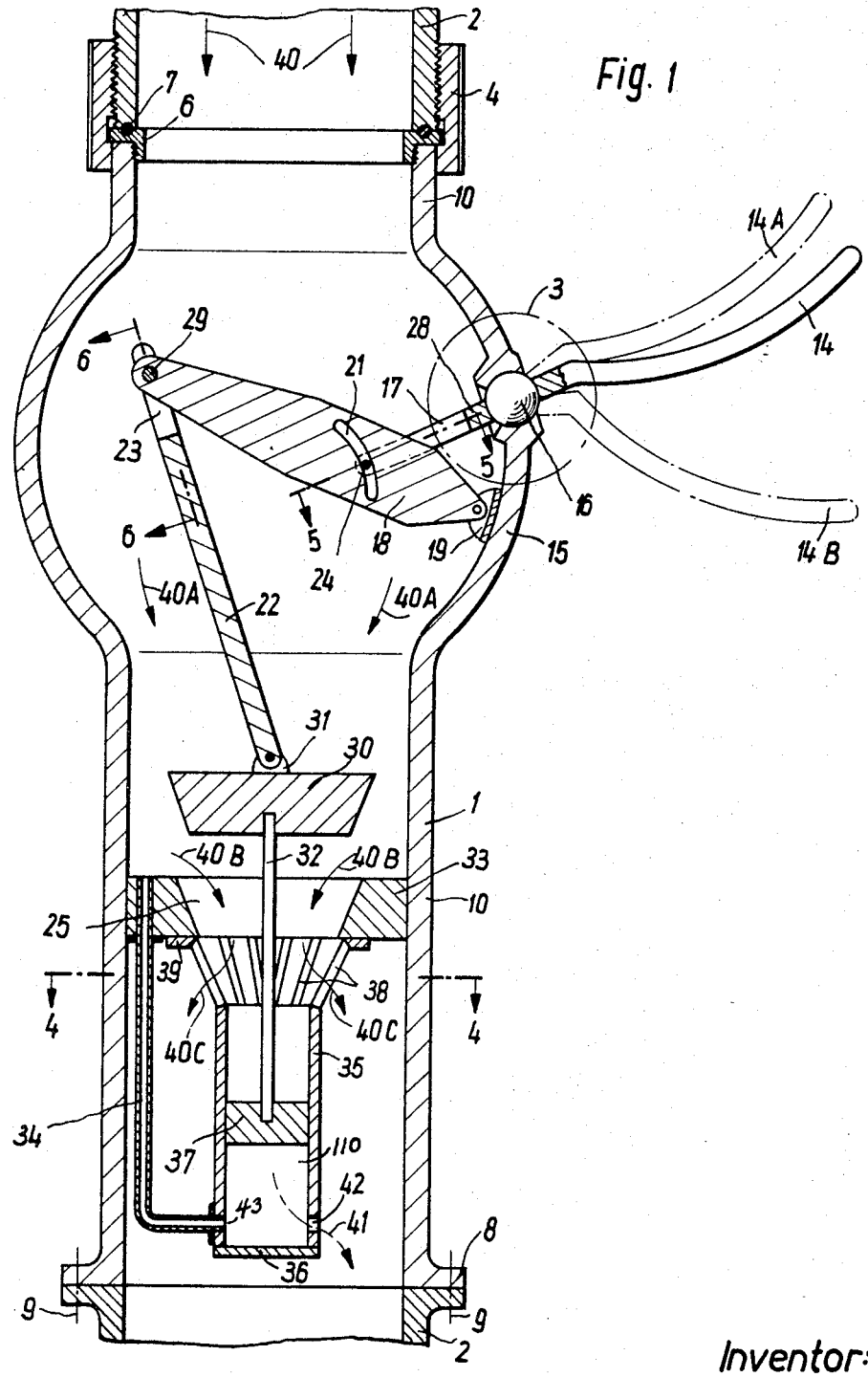

This invention relates to a flow control device for regulating fluid flow through pipes and more particularly a device for flow control of fluids through outlets at non-periodic intervals by means of a lever linked with a valve rod, a valve, a plunger and a piston in a dashpot, all so arranged that deep depression of the lever will raise the piston high in the dashpot and thereby keep the valve above its valve seat longer. A slight depression of the lever causes only a small rise of the piston and thus a brief flow of fluid through the opening in the valve seat. The main object of the invention is to provide at modest cost a practical, versatile means of controlling the time and rate of flow of fluids through pipes, faucets, flush toilets, bath showers, sprinklers, irrigation devices, etc. Another object is to provide such a device which can be modified in selective ways to meet unusual specifications, to satisfy changed requirements, to alter rate and length of flow for different times of the day or seasons of the year, etc.

Figure 1B:
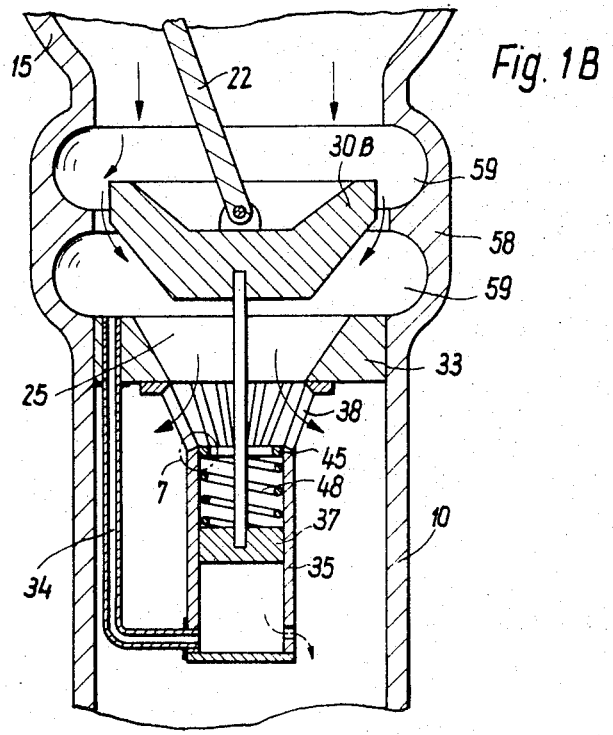
Figure 1C:
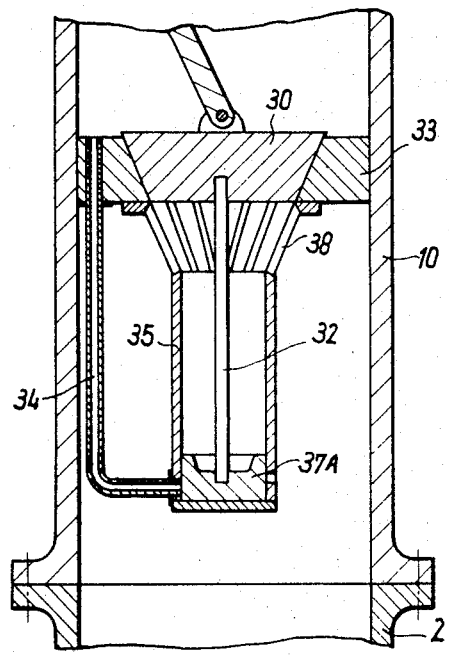
Figure 3:
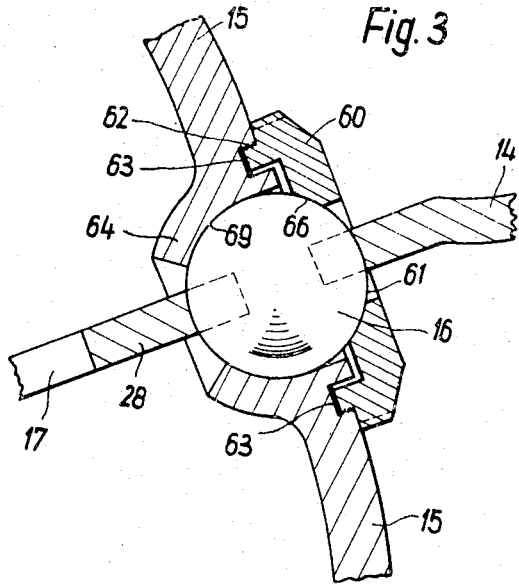
Figure 3A:
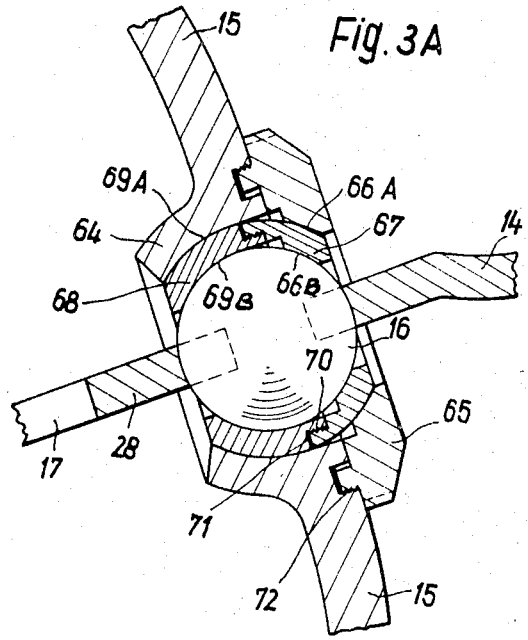
Figure 4:
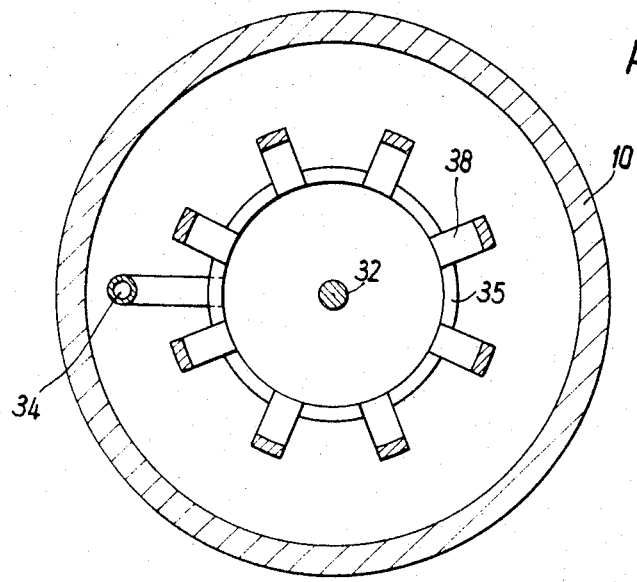
Figure 5:
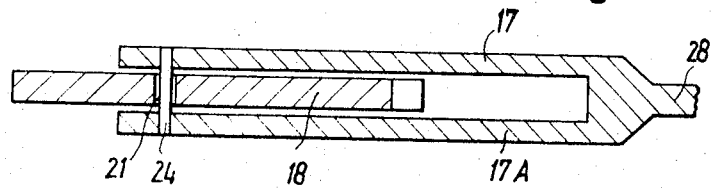
Figure 6:
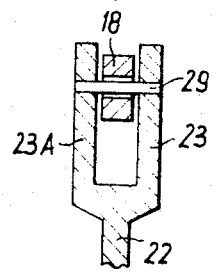
Figure 7:
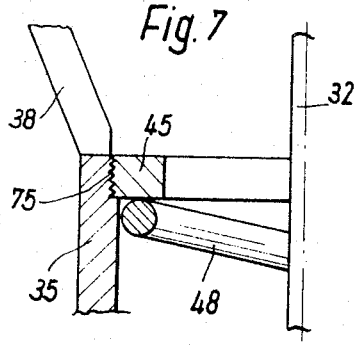
Figure 8:
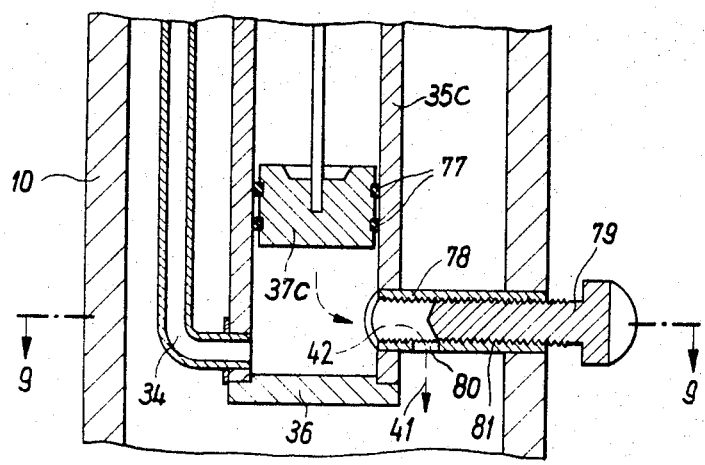
Figure 9:
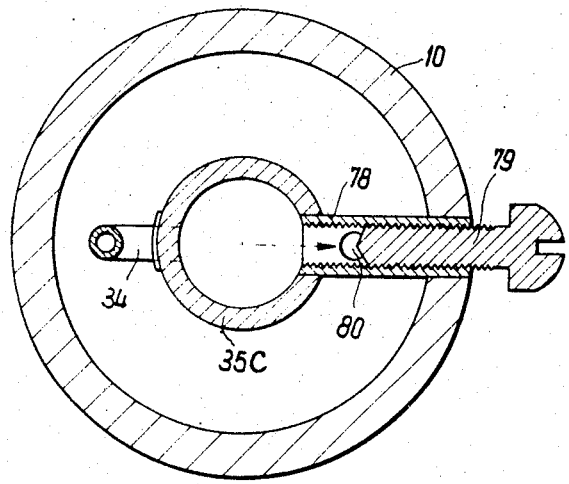
Figure 10:
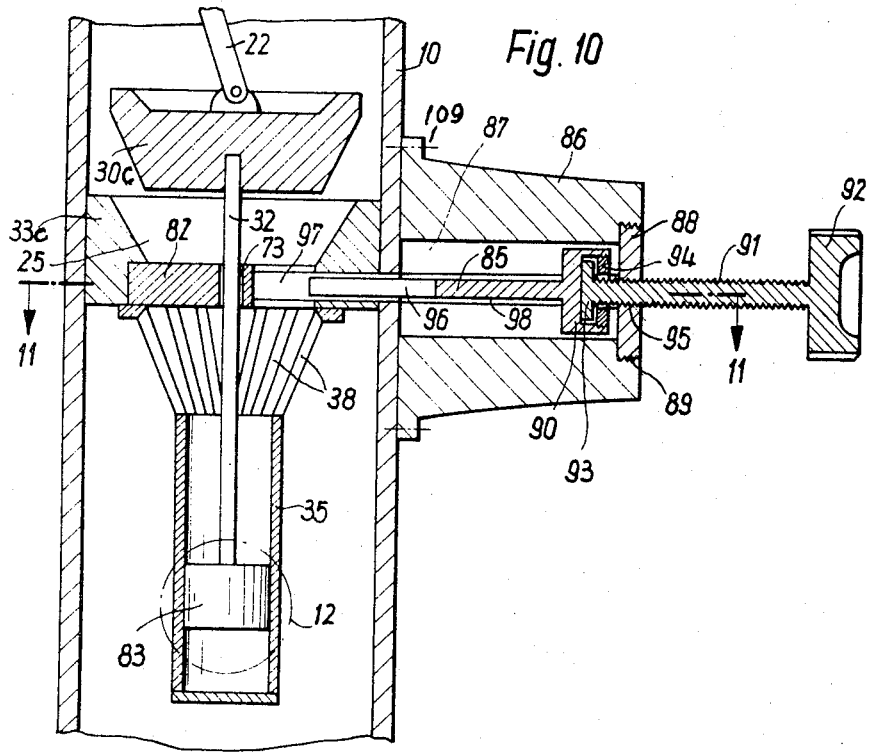
Figure 11:
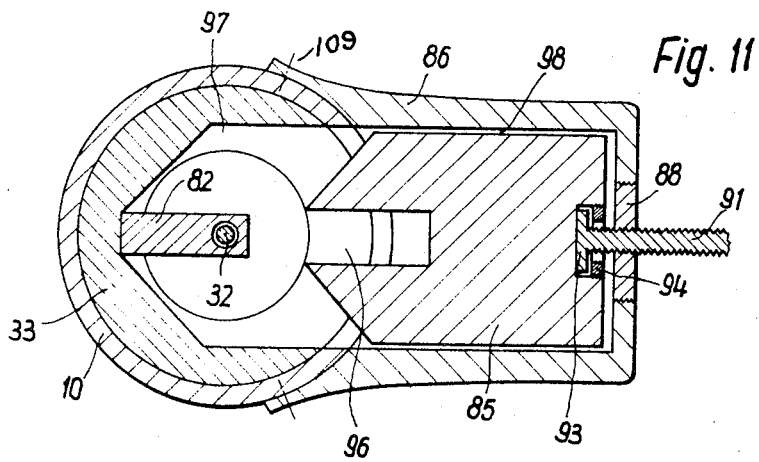
Figure 11A:
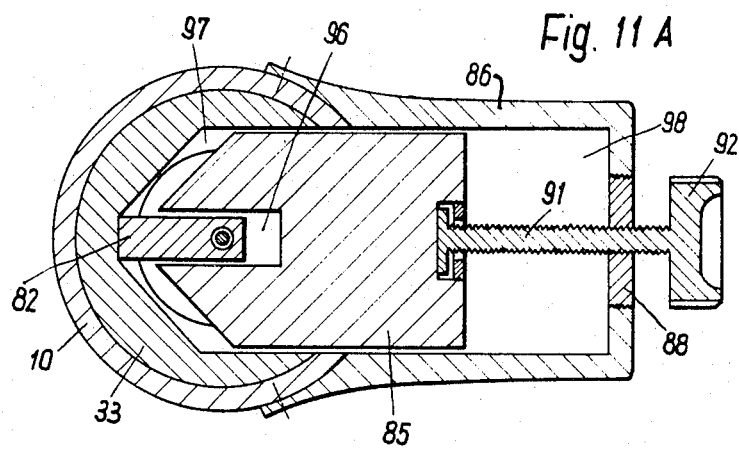
Figure 12:
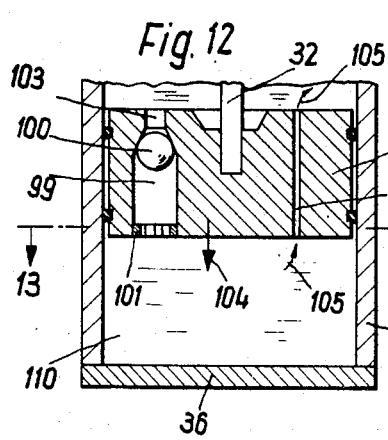
Figure 12A:
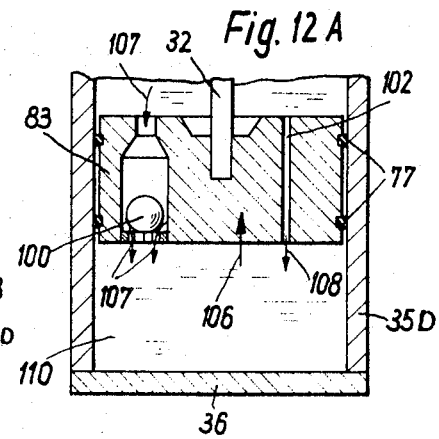
Figure 13:
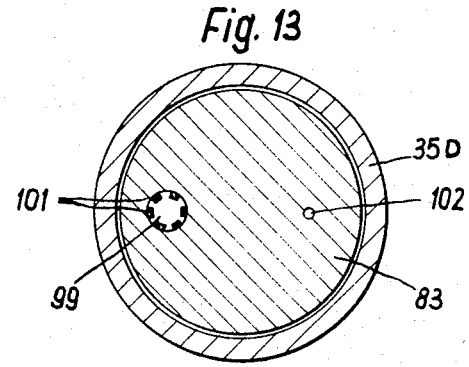

A few of dozens of possible modifications of the basic components are described, but these are illustrative only, and not limiting. The simplest ball joint is inserted directly into the socket: one modification interposes a shell between ball and socket. The preferred design for the device has a main activating lever raising a middle lever extending from the other side of the ball joint to raise a short lever having yoke arms that lift the valve rod attached to the main valve: a modification of this has the middle lever pivotally raising a pin on which the fork arms of a valve rod are supported. The simplest valve is a solid round device of greater diameter across the top than the bottom to fit closely into the round tapered valve seat, the valve rod hingeably attached to the upper and the piston plunger fixedly attached to the lower side of the valve. The basic dashpot has an open cylinder around whose top are attached multiple bars attached at the other end to an annular ring mounted on the underside of the valve seat, a piston fixedly attached to the plunger, a bottom plate closure for the cylinder closing off the inner space between it and the piston, an outlet within the cylinder wall into this inner space from a by-pass tube leading through one side of the valve seat to carry fluid from above the valve into the inner space, and a small outlet hole in the cylinder wall for the fluid from the inner space. One modification of the outlet hole is a screw cylinder threaded on the inside, penetrating both the dashpot cylinder and main cylinder, and having an outlet hole or slit through its lower side, the cylinder being designed to enclose a control screw having threads that fit the cylinder threads so that it can be screwed in to fill up any desired portion of the outlet hole. These and other features will be shown in the drawings, in which:

FIG. 1 is a vertical section on the flow control device.
FIG. 1A is a vertical section through a modification of the flow control device.
FIG. 1B is a vertical section through a second modification designed for intermittent flow.
FIG. 1C shows the lower part of the device in FIG. 1 with the valve in no-flow position.
FIG. 2 is a horizontal section along line 2—2 in FIG. 1A showing the arrangement within the cylinder bulge.
FIG. 3 is an enlargement of section 3 in FIG. 1 showing the ball-joint.
FIG. 3A is a modification of the ball-joint with a spherical shell to increase angular movability of the lever.
FIG. 4 is an enlarged horizontal section taken along line 4—4 in FIG. 1 showing the bars stabilizing the piston cylinder.
FIG. 5 is an enlarged section taken along line 5—5 in FIG. 1 showing the connection of the two levers in the bulge.
FIG. 6 is an enlarged section along line 6—6 in FIG. 1 showing the joint connecting the lever and valve rod within the cylinder bulge.
FIG. 7 is an enlargement of the section 7 in FIG. 1B showing a ring screwed to the inside of the piston cylinder.
FIG. 8 is a modification of the lower part of the piston cylinder in FIG. 1 having a screw cylinder and screw for regulating the rate of flow from the dashpot.
FIG. 9 is a horizontal section along line 9—9 in FIG. 8 showing position of the components around the screw.
FIG. 10 is a vertical section through a modified device for regulating the rate of flow through the main valve.
FIG. 11 is a horizontal section along line 11—11 in FIG. 10 showing the valve plate in open position.
FIG. 11A shows the valve plate almost closed.
FIG. 12 is an enlargement of section 12 in FIG. 10 with the dashpot piston moving downward.
FIG. 12A shows the dashpot piston of FIG. 12 moving upward, with fluid entering space below the piston.
FIG. 13 is a horizontal section along line 13—13 in FIG. 12 showing positions of inlet and outlet openings.

We turn now to the drawings. The preferred embodiment of the flow control device is shown in side and top views in FIGURES 1A and 2. The main activating lever 14 is fixedly mounted on ball 16 of the ball joint inserted directly into the socket formed by enlarging the wall of bulge 15 of cylinder 10. Extending from the other side of ball 16 is lever 52 having a straight slit 51 parallel to the end section of the lever, disposed around pin 50 which slides through it and it supported by extensions 55 and 55A mounted on yoke arms 53 and 53A which are hingeably attached to and supported by pins 57 and 57A respectively held by hinge tabs 56 and 56A mounted on the wall of bulge 15.

Yoke arms 53 and 53A extend into lever 54 on the other end of which are fork arms 27 and 27A that support pin 29 in holes penetrating each fork arm near its end. Plunger 22A pivots on and is lifted by pin 29, the latter being hingeably attached to hinge base 31A mounted in hollow 49 on top of valve 30A. A plunger mounted on the bottom of valve 30A is attached to piston 37 in dashpot 35 which is stabilized by bars 38A mounted on the underside of valve seat 33, and is covered by cone 46 and washer 47, both fixedly attached near the top of the cylinder of dashpot 35. Spring 48, held under compression between washer 47 and piston 37, speeds the flow of fluid through outlet 42 and thereby shortens flow time through space 25 in valve seat 33, by pressing on top of piston 37. In operation, when lever 14 is lowered lever 52 is raised lifting pin 50 which slides in slit 51 and raises pin 29 which raises plunger 22A lifting valve 30A from valve seat 33, allowing fluid to pass through. The space below piston 37 is filled through by-pass tube 34. The time that liquid flows through space 25 is determined by the strength of spring 48, the size of outlet 42 in relation to the space below piston 37, water pressure, friction and gravity.

Modifications of the components in another embodiment of the flow control device are shown in FIGURES 1, 1C, 3, 4, 5, 6, 10, 11, and 11A, the latter three illustrating the way of controlling the rate of flow, the others illustrating a way of controlling the time of flow. The other drawings show details and/or modifications of the essential components.

Any pipe 2 carrying fluid can be connected to the main cyilnder of the device in a number of ways, such as by screws or other conventional means 9 through a flange as shown below, or by coupling 4 and angular flanged screw ring 6 having ring seal 7 to prevent leakage, as shown above. Cylinder 10 has a bulge 15 through whose walls a lever 14 can operate the device, by means of a balljoint composed of ball 16 and socket 64 which can be an enlarged part of the bulge, as in FIG. 1. Details are shown in FIG. 3 with ball 16 movably held in socket 64 by top plate 60 having threads 62 that screw into the socket, secured there by locking means 63 such as a lock-washer or Belleville spring. Lever 14, penetrating into ball 16, can be raised or lowered to various positions such as shown by dotted lines at 14A and 14B, to reduce or increase respectively the time of flow. Shaft 28, fixedly attached to ball 16, is manipulated by lever 14, and is divided at the end into a fork with two fork-arms 17 and 17A (not shown). A pin 24, penetrating two holes near the fork-arm ends, is supported by them and slides up or down in curved slit 21 in lever 18 which is hingeably attached to the wall of bulge 15 by a pin through hinge base 19. The other end of lever 18 pivots on pin 29 which is supported by rod arms 23 and 23A (not shown) with ends through which it penetrates, the rod arms being fixedly attached to valve rod 22 whose opposite end is hingeably attached to hinge base 31 mounted on valve 30.

Plunger 32 is fixedly attached above to the underside of valve 30 and below to the top of dashpot piston 37 which is thus moved up and down in dashpot 35 as valve 30 is moved up and down by the lever action of lever 14. Lower space 110 within the dashpot cylinder is delimited by piston 37 above and bottom 36 below. Dashpot 35 is stabilized by bars 38 attached to annular ring 39 mounted on the underside of valve seat 33 into which valve 30 fits when lever 14 is at the top of its arc and piston 37 is at its bottom position near bottom 36 of the dashpot. Space 110 is filled with fluid from above valve seat 33 flowing through by-pass tube 34 and outlet 43 when valve 30 is raised and piston 37 is above bottom 36. Time of flow is determined by the size of dashpot outlet 42, the dimensions of dashpot 35, the height to which piston 37 has been raised by lever 14, and friction. The rate of fluid flow (arrow 41) from space 110 can be altered as desired by modifications shown in FIGURES 8 and 9.

When lever 14 is lowered, as to 14B, pin 24 slides up in slit 21 to raise lever 18, simultaneously raising valve rod 22, valve 30, plunger 32 and piston 37, allowing fluid (arrows 40 and 40A) to flow through opening 25 in valve seat 33 and bars 38 (arrows 40B and 40C) beyond the dashpot. Fluid entering dashpot 35 above piston 37 can be ignored, but this can be prevented by modifications shown in FIG. 1A. Hydrodynamic forces on top of valve 30 slowly push it down against the resistance of the fluid in space 110 whose main outlet 42 is restricted. Backflow through outlet 43 into by-pass tube 34, if any, is negligible. The descent of valve rod 22 causes lever 18 to pull down shaft 28, thus raising lever 14 to its top position, such as 14B. The shape and smoothness of the edges of slit 21 are vital points, and it may be found that a different angle, such as that of slit 51 in lever 52 (FIG. 1A) would be preferable. Using nylon around slit 21, or in all of lever 18, would reduce the friction on pin 24. Also, a spring could be provided to restore lever 14 to its top position, but this is not vital to the invention.

When valve 30 is seated in valve seat 33 as in FIG. 1C piston 37 closes off outlets 43 and 42 so no more fluid can enter or leave space 110 until lever 14 is lowered again. Here piston 37A is shown with an optional hollowed top. It can also be notched or bevelled near outlet 34 to prevent a vacuum as it starts up.

FIG. 4, an enlarged horizontal section taken on line 4—4 in FIG. 1 shows the position of bars 38 slanting down to the top of dashpot 35, and of by-pass tube 34 leading down to space 110.

FIG. 5, an enlarged section along line 5—5 in FIG. 1, shows the relative positions of shaft 28, fork-arms 17 and 17A extending from it, pin 24 supported by the fork-arms, and of lever 18 which pivots on the pin and is lifted by it.

Another modification is shown in FIG. 1B in which cylinder 10 has a plurality of indentations in the form of annular spaces 59 and 59A in the enlarged section 58 of the cylinder above valve seat 33. The flow of liquid through space 25 is copious when the edge of valve 30B is next to one of the indentations, but is restricted when the valve edge is between the indentations, as in FIG. 1B. The result is an intermittent flow, now sparse, now copious, the number of copious flows being determined by the number of indentations and the height to which valve 30B is raised among them. An obvious application would be in wash-room faucets, and in homes where users like to keep the faucet running while they shave or brush their teeth.

A detail of section 7 in FIG. 1B is shown in FIG. 7 where spring 48 is held down by inner spring 45 having threads 75 that screw into the top inside of dashpot 35.

A modification of the ball-joint of FIG. 1 and FIG. 3 is shown in FIG. 3A. Greater freedom for lever 14 is made possible by inserting shell 68 having sling surfaces 69 and 69A between ball 16 and socket 64. The ball is kept in the shell by quartershell 67 with sliding surfaces 66B and 66A, and threads 70 that screw into shell 68 and are secured by locking means 71 such as a lock-washer or Belleville spring. Shell 67 is secured in its place by top plate 65 with threads 72 that screw into bulge 15.

A modification of dashpot 35 is shown in FIGS. 8 and 9. Piston 37C is provided with piston rings and a screw-cylinder 78 that extends into and between dashpot 35C and cylinder 10, extending through the latter. Control screw 79 having threads 81 can be moved to any desired length in cylinder 78 to regulate the flow 42 of fluid from dashpot 35C through outlet hole 80 in the bottom of cylinder 78, as indicated by arrow 41. The threads of screw 79 fit into the inside threads of screw-cylinder 78. Outlet 80 may be round as in FIG. 9, rectangular, or a slit.

FIGURES 10, 11 and 11A show a control device for regulating the rate as well as length of flow through a pipe. Valve 30C is lifted by valve-rod 22 from valve seat 33C mounted inside cylinder 10. Plunger 32 is mounted below valve 30C and has piston 37 fixedly attached to its lower end piston 83 which rises and falls within dashpot 35, the latter being stabilized by bars 38 attached to a ring on the underside of valve seat 33C.

Mounted at the edge of valve seat 33C is plunger guide 82 having a hole through which plunger 32 slides up and down. The rest of opening 97 can be filled by valve plate 85 which has a gap 96 that fits around plunger guide 82 when pushed to left as in FIG. 11A. At the other extreme valve plate 85 is withdrawn into slit 98 and opening 87 in plate holder 86 attached to cylinder 10 by conventional means 109 such as screws. Plate 98 has a socket head 90 into which fits flanged foot 93 of thumb screw 91 having head 92. Threaded lock ring 94 screws into socket head 90 to hold flanged foot 93 in place. Thumb screw 91 is stabilized in plate holder 86 by threaded washer 88 screwed therein which has threads 95 that fit the threads of screw 91 which is thereby moved to the right or left to increase or decrease the liquid flow through opening 97 in valve seat 33C, as shown in FIGS. 11 and 11A respectively.

A modified dashpot is shown in FIGS. 12, 12A and 13 giving details of piston 13 in circle 12 of FIG. 10. It has no by-pass to fill it, and no outlet. Instead fluid comes in through a one-way valve consisting of a ball 100, lighter than the fluid, that stops fluid flow when it is in the conical section between small tube 103 and large tube 99. When valve 30C, FIG. 10, is lifted plunger 32 pulls up piston 83 as in FIG. 12A (arrow 104) and ball 100 is forced down by the fluid till it comes to rest on grid 101 that keeps it from falling out, while fluid flows down around it as shown by arrow 107 to quickly fill space 110. Fluid also flows (arrow 108) through thin tube 102, but when the value 30C reaches its highest point it starts to descend, sending piston 83 down (arrow 104) also, this causing the lighter-than-fluid ball 100 to rise, cutting off upward flow, as in FIG. 12. The only outlet is tube 102 through which fluid flows upward (arrows 105); the rate of descent of piston 83 (and thus the time valve 30C is open) is thus largely determined by the size of thin tube 102. The length of fluid flow is also influenced by friction, gravity, the height to which lever 14 is raised, valve plates such as in FIGS. 10 and 11, etc.

I claim:

1. In a flow control device for selective regulation of the rate, quantity and duration of fluid flow by means of an activating lever penetrating the wall of a fluid carrying means, linkage means to a valve means and a time control means, the improvement comprising:
    a principal cylinder connected at each end to said fluid-carrying means and having one section enlarged into a bulge;
    bearing means such as a shell mounted within said bulge;
    a ball joint movably mounted within said bearing means, the ball of said ball joint being penetrated by said activating lever the outer end of which serves as a hand-lever and the inner end of which extends inward from said ball;
    connecting means such as a slit in said inner end of the activating lever;
    said linkage means including
        a pin disposed in and slidable wthin said connecting means and having ends held by extensions of the yoke arms of a lever hereinafter called a middle lever, the yoke arms being hingeably attached to hinge tabs mounted on said wall of said bulge, the end of the middle lever ending in two fork arms each penetrated by a hole,
        a pin inserted in and supported by said holes in the fork arms and supporting one end of a valve plunger pivotally mounted thereon, the other end of the plunger being hingeably mounted to the valve of said valve means which has mounted on its underside a piston plunger on the other end of which is attached the piston of said time control means;
    said valve fitting closely into the opening of a valve-seat mounted on the inner wall of said principal cylinder a suitable distance below said bulge, said valve seat being penetrated by a channel for a by-pass tube that leads to and through the lower wall of said valve control means to conduct fluid thereinto, and said time control means coacting with said linkage means to permit said activating lever to control the time said valve remains open.

2. In a flow control device for selective regulation of fluid flow having an activating lever penetrating the wall of a fluid carrying means and linked by linkage means to a valve means coacting with a time control means, the improvement wherein said time control means is a dash-pot comprising:
    a cylinder closed on the lower end and attaching means on its upper end by which it is mounted on the lower side of said valve seat;
    a piston attached to the lower end of said piston plunger the upper end of which is mounted to the lower side of said valve, the piston being dispoosed within the dash-pot cylinder so as to move freely up and down with said valve;
    a closing means mounted to the upper edge of said cylinder and having a center hole through which said piston plunger glides;
    a spring of the compression type disposed between said closing means and the top of said piston upon which it impinges, to help restore all parts to the closed position after each valve opening;
    an outlet hole from the chamber below said piston penetrating the wall of said cylinder; and
    a by-pass tube penetrating said valve seat and leading to and through the wall of said cylinder below said piston to conduct fluid from above said valve means when said valve is closed or closing into the chamber below said piston, said chamber being enlarged as said piston and the valve to which it is attached is raised by the depression of said activating lever acting through said linkage means, and the outflow of fluid from said chamber being controlled by the diameter of said outlet hole, all parts coacting to control the rate, quantity and duration of fluid flow.

3. The flow control device of claim 1 wherein said principal cylinder contains at least one indentation between said bulge and said valve seat, to obtain intermittent flow past the valve.

References Cited

UNITED STATES PATENTS

| 816,290 | 3/1906 | Barrett | 251—50 X |
| 878,166 | 2/1908 | Turnbull | 251—51 |
| 914,587 | 3/1909 | Longstreet | 251—50 |
| 2,651,051 | 9/1953 | Parks et al. | 251—235 X |

ARNOLD ROSENTHAL, *Primary Examiner.*

U.S. Cl. X.R.

251—51, 232, 235